United States Patent
Lee et al.

(10) Patent No.: US 8,325,387 B2
(45) Date of Patent: Dec. 4, 2012

(54) METHOD AND APPARATUS FOR DITHERING A PIXEL VALUE IN IMAGE

(75) Inventors: Min-Woo Lee, Suwon-si (KR); Min-Kyu Park, Seoul (KR); Sung-Dae Cho, Yongin-si (KR)

(73) Assignee: Samsung Electronics Co., Ltd., Samsung-ro, Yeongtong-gu, Suwon-si, Gyeonggi-do (KR)

(*) Notice: Subject to any disclaimer, the term of this patent is extended or adjusted under 35 U.S.C. 154(b) by 1026 days.

(21) Appl. No.: 12/333,447

(22) Filed: Dec. 12, 2008

(65) Prior Publication Data

US 2009/0154831 A1 Jun. 18, 2009

(30) Foreign Application Priority Data

Dec. 12, 2007 (KR) .................. 10-2007-0128943

(51) Int. Cl.
*H04N 1/405* (2006.01)
(52) U.S. Cl. ................................. 358/3.13; 358/3.14

(58) Field of Classification Search .............. 358/1.9, 358/2.1, 462, 464, 3.03–3.06, 3.13–3.15, 358/3.21–3.22, 3.26–3.27
See application file for complete search history.

(56) References Cited

U.S. PATENT DOCUMENTS

| 7,733,532 B2* | 6/2010 | Keithley et al. ............. 358/3.06 |
| 2005/0134880 A1* | 6/2005 | Kang et al. .................... 358/1.9 |

FOREIGN PATENT DOCUMENTS

| JP | 05075864 A | * | 3/1993 |
| JP | 2003304400 A | * | 10/2003 |

* cited by examiner

*Primary Examiner* — Thomas D Lee
*Assistant Examiner* — Stephen M Brinich
(74) *Attorney, Agent, or Firm* — Cha & Reiter, LLC

(57) ABSTRACT

Disclosed is a method and an apparatus for dithering a pixel value in a image. The method includes checking a difference in chrominance signals between a particular pixel and a pixel adjacent to the particular pixel, in an input image, designating the particular pixel as being in a flat or a non-flat area in consideration of the difference in chrominance signals and dithering the particular pixel when the pixel is designated as being in the non-flat area.

19 Claims, 6 Drawing Sheets

|   |   |   |   |   |   |   |   |
|---|---|---|---|---|---|---|---|
|   |   |   |   |   |   |   |   |
|   |   |   |   |   |   |   |   |
|   |   | A | B | C |   |   |   |
|   |   | D | E | F |   |   |   |
|   |   | G | H | I |   |   |   |
|   |   |   |   |   |   |   |   |
|   |   |   |   |   |   |   |   |
|   |   |   |   |   |   |   |   |

FIG.2

| b7 | b6 | b5 | b4 | b3 | b2 | b1 | b0 |
|----|----|----|----|----|----|----|----|

FIG.3

METHOD AND APPARATUS FOR DITHERING A PIXEL VALUE IN IMAGE

CLAIM OF PRIORITY

This application claims the benefit of the earlier filing date, under 35 U.S.C. §119(a), to that patent application entitled "Method and Apparatus for Dithering" filed in the Korean Intellectual Property Office on Dec. 12, 2007 and assigned Serial No. 2007-0128943, the contents of which are incorporated herein by reference.

BACKGROUND OF THE INVENTION

1. Field of the Invention

The present invention relates to a method for dithering, and more particularly to a method for dithering that prevents distortion of an image and the degradation of image quality.

2. Description of the Related Art

In order to meet various requirements of users, the functions of digital image devices for reproducing colors (such as monitors, scanners, printers, etc.) have diversified, and have been improved. Also, according to the field of use of each digital image device, digital image devices may adopt different color spaces or color models according to their use fields. Color models are classified into device-dependent color models and device-independent color models. Examples of the device-dependent color models include red-green-blue (RGB) models, which are types of addition color space models, and cyan-magenta-yellow-black (CMYK) color models which are types of subtraction color space models. Examples of the device-independent color models include CIE color models, such as a CIE L*a*b* model, a CIE XYZ model, and a CIE LUV model, etc. The CIE color models are determined by the International Commission on Illumination (ICI) which determines standards for illumination devices. The CIE XYZ model represents a set of RGB tristimulus values as another set of tristimulus values which are all positive X, Y, and Z values. The CMYK color space is used in the field of printing, and the RGB color space is used in the field of graphic presentation, e.g., computer monitors, used for Internet input/output. When it is impossible to use a required color in representing an input image with high gradation on an output device with low gradation precision, a dithering technique is mainly used for representing similar colors by mixing a set of dots of colors with different gradations. For example, on display devices or printing devices, an image, or portions thereof, may be represented either in a gray color with a particular gradation according to the ratio of black dots to white dots, or in pink colors with various gradations according to the ratio of red dots to white dots. In an output device with a low resolution, the dithering technique is used to improve the reality of an image and prevent contours, etc., which are not smooth but rough, from catching the eyes of viewers. The conventional dithering technique as described above has been used to represent an input image signal with higher resolution than that of an output device. As conventional dithering technique, spatial dithering and/or spatial-temporal dithering are used.

The spatial dithering technique adopts a method for removing some lower bits from an image signal on an input-bit basis. Specifically, some lower bits are removed from an image signal on a bit-by-bit basis. Then, the spatial dithering technique generates a random number from a random number generator, compares a magnitude of the generated random number with a magnitude of the removed bits, and then selectively adds "1" to a Least Significant Bit (LSB) of an input image signal.

The dithering method using a random number as described above causes the problem that noise equivalent to a random number generated in the process of dithering is intactly inserted into either an area, where a particular Gray pattern appears, or a flat area with a single tone. Also, the generation of a random number is not uniform, but may be concentrated on a number. Therefore, for example, the degradation of image quality is generated such that colors in a particular area of an image become light or dark.

Hence, there has been a need for a image processing method which minimizes color distortion in the entire image, and in which the degradation of image quality caused by dithering does not appear even in a flat area of an image.

SUMMARY OF THE INVENTION

The present invention provides a dithering method which removes noise generated due to a random number in the process of dithering in a flat area of an image, thereby minimizing color distortion in the entire image and reducing the degradation of image quality.

Also, the present invention provides a dithering method that distributes random numbers used in the process of dithering over the entire image, thereby minimizing color distortion in the entire image and reducing the degradation of image quality.

In accordance with an aspect of the present invention, there is provided a method for dithering image data, the method including the steps of checking a difference in chrominance signals between a particular pixel and a pixel adjacent to the particular pixel included in a predetermined unit block, in an input image; designating the unit block as being in a flat area or a non-flat area in consideration of the result of checking the difference in chrominance signals; and dithering pixels of the unit block designated as being in the non-flat area.

The step of checking a difference includes a step of calculating an absolute value of the difference in chrominance signals between the particular pixel and a surrounding pixel adjacent to the particular pixel. The designation step may include the sub-steps of comparing, with a first threshold value, the absolute value of the difference in chrominance signals between the particular pixel and a surrounding pixel adjacent to the particular pixel, calculating, from a result of the comparison, a number of pixels required for determination of a flat or non-flat area in consideration of the particular pixel and a number of surrounding pixels adjacent to the particular pixel and comparing the calculated number of pixels with a second threshold value for the determination of a flat or non-flat area, and determining the unit block as the flat or non-flat area.

The second threshold value may be selected as a number corresponding to one-half the sum of the pixels included in the unit block.

The number of pixels required for the determination of a flat or non-flat area may be selected as a number of the absolute value of the differences smaller than the first threshold value.

In the step of determining the unit block as the flat or non-flat area, the particular pixel may be designated as the flat area if the number of pixels required for the determination of the flat or non-flat area is larger than the second threshold value, and the particular pixel may be designated as the non-flat area if the number of pixels required for the determination of the flat or non-flat area is equal to or smaller than the second threshold value.

The dithering includes the sub-steps of removing a number of lower bits representing a chrominance signal in consideration of a magnitude of an image to be reduced, generating a random number in a range corresponding to the removed lower bits, comparing a value represented by the removed lower bits with the generated random number and adding a value of "1" to a Least Significant Bit (LSB) of the remaining bits, representing the chrominance signal, with the removed lower bits if it is determined that the value represented by the removed lower bits is larger than the generated random number.

Preferably, in the step of generating a random number, the same random number as the already-generated random number is prevented from being generated in the range corresponding to the removed some lower bits.

In accordance with another aspect of the present invention, there is provided an apparatus for dithering input image data and outputting the dithered image data, the apparatus including a flat/non-flat area check unit for checking a difference in chrominance signals between a particular pixel and a pixel adjacent to the particular pixel included in a predetermined unit block, in an input image, and designating the unit block as a flat or non-flat area in consideration of the result of checking the difference in chrominance signals, a bit removal unit for removing a number of lower bits of the chrominance signal of the particular pixel included in the unit block in response to an output bit, a random number generation unit for generating a random number in a range of the lower bits removed by the bit removal unit, a comparison unit for comparing a value of the lower bits removed by the bit removal unit with the random number generated by the random number generation unit, and outputting a result of the comparison and a dithering arithmetic unit for receiving as an input a signal indicating whether the particular pixel corresponds to the flat or non-flat area from the flat/non-flat area check unit, and, in response to the input signal, outputting the chrominance signal with the lower bits removed by the bit removal unit, or dithering the chrominance signal with the removed lower bits based on the result of the comparison from the comparison unit.

Preferably, the flat/non-flat area check unit calculates an absolute value of the difference in chrominance signals between the particular pixel and a surrounding pixel adjacent to the particular pixel, and checks the difference between the particular pixel and a pixel adjacent to the particular pixel.

The flat/non-flat area check unit includes: an absolute value of the difference value calculation unit for calculating the absolute value of the difference in chrominance signals between the particular pixel and each of surrounding pixels adjacent to the particular pixel included in the unit block, a comparison value calculation unit for comparing each absolute value of the difference in chrominance signals provided by the absolute value calculation unit with a first threshold value, a counter for calculating, from an output value of the comparison value calculation unit, a number of pixels required for determination of a flat or non-flat area in consideration of the particular pixel and a number of surrounding pixels adjacent to the particular pixel and a flat/non-flat determination unit for comparing an output value of the counter with a second threshold value predetermined for the determination of a flat or non-flat area, and determining the particular pixel as the flat or non-flat area.

The second threshold value may be a number corresponding to one-half of a total number of the pixels included in the unit block.

The counter calculates a number of the absolute value of the differences smaller than the second threshold value.

The flat/non-flat determination unit may designate the unit block as the flat area if the output value of the counter is larger than the second threshold value, and the flat/non-flat determination unit may designate the unit block as the non-flat area if the output value of the counter is equal to or smaller than the second threshold value.

Preferably, the dithering arithmetic unit outputs the chrominance signal with the a number of lower bits removed by the bit removal unit with respect to the unit block designated as the flat area; and the dithering arithmetic unit dithers the chrominance signal with the removed lower bits with respect to the unit block designated as the non-flat area, and outputs the dithered chrominance signal.

Preferably, the random number generation unit prevents the same random number as the already-generated random number from being generated in the range of the lower bits removed by the bit removal unit.

BRIEF DESCRIPTION OF THE DRAWINGS

The above and other exemplary features, aspects, and advantages of the present invention will be more apparent from the following detailed description taken in conjunction with the accompanying drawings, in which:

FIG. 2 is an illustrative view of a particular pixel of an image frame input to the dithering apparatus according to an embodiment of the present invention;

FIG. 3 is an illustrative view showing, on a bit-by-bit basis, a chrominance signal of the particular pixel of FIG. 2;

DETAILED DESCRIPTION OF THE INVENTION

Exemplary embodiments of the present invention will be described in detail with reference to the accompanying drawings. Particulars found in the following description of the present invention, such as specific configuration elements, etc., are provided only to assist in a comprehensive understanding of the present invention. Also, in the following description of the present invention, a detailed description of known functions and configurations incorporated herein will be omitted when it may make the subject matter of the present invention rather unclear.

Figure 1:
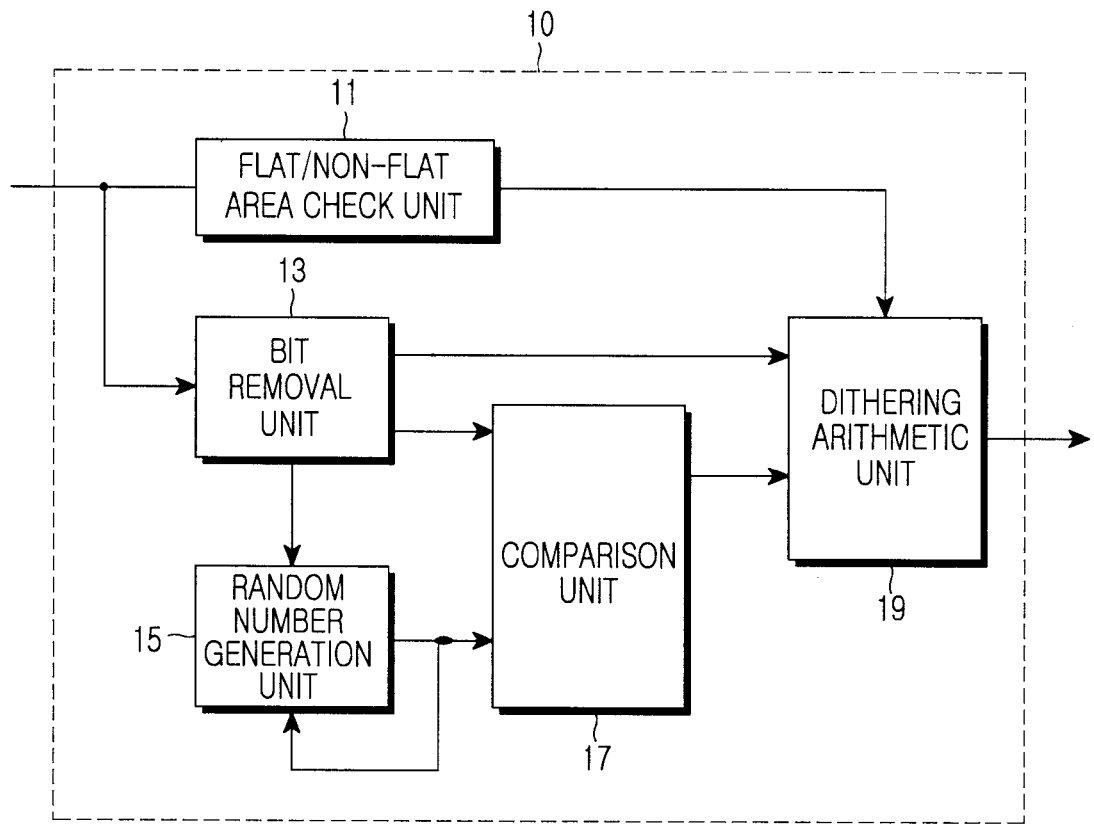
FIG. 1 is a block diagram illustrating a configuration of a dithering apparatus according to an embodiment of the present invention.

FIG. 1 is a block diagram illustrating a configuration of a dithering apparatus according to an embodiment of the present invention. Referring to FIG. 1, a dithering apparatus 10 according to an embodiment of the present invention includes a flat/non-flat area check unit 11, a bit removal unit 13, a random number generation unit 15, a comparison unit 17, and a dithering arithmetic unit 19.

The flat/non-flat area check unit 11 checks whether predetermined unit blocks included in image data input are a flat or non-flat area, wherein the predetermined unit blocks is a block of n×n, e.g., 3×3. The flat/non-flat area check unit 11 calculates a difference in chrominance signals between a particular pixel (e.g. a pixel E in FIG. 2) included in the inut block and each of the surrounding pixels (e.g. pixels A, B, C, D, F, G, H, and I in FIG. 2) adjacent to the particular pixel. Then, the flat/non-flat area check unit 11 compares each calculated difference with a first threshold value (e.g. 1 or 2).

Also, the flat/non-flat area check unit 11 calculates a number of pixels having a difference in chrominance signals equal to or smaller than, or larger than the first threshold value. Then, the flat/non-flat area check unit 11 compares the calculated number of pixels with a second threshold value for the determination of a flat or non-flat area. Herein, it is desirable that the second threshold value is equal to a number corresponding to one-half of a sum of pixels included in the unit block.

Further, if the calculated difference is equal to or smaller than the second threshold value, the flat/non-flat area check unit 11 designates the unit block as the flat area. On the other hand, if the calculated difference is larger than the second threshold value, the flat/non-flat area check unit 11 designates the unit block as the non-flat area.

The flat/non-flat area check unit 11 determines the flat or non-flat area for each of the unit blocks included in the input image frame in the method as described above.

The bit removal unit 13 removes a predetermined number of lower bits of a chrominance signal of each pixel included in the input image frame in consideration of a bit depth of an image to be output. For example, when a pixel is output as 5-bit R, 6-bit G, and 5-bit B values with respect to a value of 24 bits configured by 8-bit R, 8-bit G, and 8-bit B values, the bit removal unit 13 removes the lower three bits from the 8-bit R value, and reconfigures the R value as a 5-bit length. Namely, referring to FIG. 3, the bit removal unit 13 removes lower three bits (i.e. b0, b1, and b2 bits) from the 8-bit R value of b7 to b0 bits. With this, the R value is reconfigured as a value of b7 to b3 bits. Similar reduction of bits in the Green (G) and Blue (B) values are performed, but not shown.

The random number generation unit 15 generates a random number that can be generated in a range of the value of lower bits removed by the bit removal unit 13. For example, numbers which can be generated by a combination of three bits are eight integer numbers from 0 to 7. When the lower three bits are removed by the bit removal unit 13, the random number generation unit 15 randomly generates any of natural numbers ranging from 0 to 7. Similarly when only two bits are removed, then the random number generated is in the range of 0-3. One skilled in the art would thus recognize the range of values of the generated random number when additional lower bits are removed.

Meanwhile, when generating a random number in the range of the value of bits removed by the bit removal unit 13, the random number generation unit 15 may do it in such a manner as to prevent the generated random number from having a minimum or maximum value in the range of value of the removed bits. When dithering an image by using the random number non-uniformly generated in such a manner as to have a minimum or maximum value, the color of the dithered image is affected in such a manner as to become light or dark. Accordingly, it is desirable that the random number generation unit 15 generates a random number uniformly distributed in the range of generating a random number. Desirably, the random number generation unit 15 can be implemented so that an already-generated random number may not be re-generated in the range of generating a random number. If the value of an initially-generated random number is 6 when a random number is generated in the range of three bits (i.e., 0-7), a next-generated random number is generated from the remaining seven numbers excluding the already-generated 6. Then, if a next-generated random number is 0, a random number is generated from the remaining six numbers again excluding 0 and 6. After generating random numbers corresponding to all numbers, which can be generated in the range of three bits, by repeating the process as described above, the random number generation unit 15 generates all numbers which can be re-generated in the range of three bits. In a process of dithering an input image, the random number generation unit 15 repeatedly performs the process as described above, thereby preventing generated random numbers from being concentrated to a single value.

The comparison unit 17 receives as input both a value represented by the lower bits removed by the bit removal unit 13 and a random number generated by the random number generation unit 15, and compares the random number with the value represented by the removed lower bits. Then, the comparison unit 17 outputs a value of the comparison result to the dithering arithmetic unit 19. For example, the value of the comparison result provided by the comparison unit 17 may be a value indicating whether the value represented by the removed lower bits is equal to or smaller than, or larger than the generated random number.

Although it is exemplified that the value of the comparison result provided by the comparison unit 17 may be a value indicating whether the value represented by the removed lower bits is equal to or smaller than, or larger than the generated random number, the present invention is not limited to this example. The value of the comparison result is satisfied if the dithering arithmetic unit 19 can check the magnitude relation between the value of the lower bits removed by the bit removal unit 13 and the random number generated by the random number generation unit 15 from the value of the comparison result in order to dither the value of the input image.

The dithering arithmetic unit 19 receives as input a signal indicating whether the unit block corresponds to the flat or non-flat area from the flat/non-flat area check unit 11, and selectively dithers pixels of the unit block in response to the input signal. Namely, when receiving as input the signal indicating whether the unit block corresponds to the flat area, the dithering arithmetic unit 19 does not dither pixels of the unit block, but intactly outputs bits whose lower bits are removed by the bit removal unit 13. On the other hand, when receiving as input the signal indicating whether the unit block corresponds to the non-flat area, the dithering arithmetic unit 19 selectively adds "1" to an LSB of the remaining bits in consideration of a value received as input from the comparison unit 17. For example, if the value received as input from the comparison unit 17 is a value indicating whether the value represented by the removed lower bits is larger than the generated random number, the dithering arithmetic unit 19 adds "1" to the LSB of the remaining bits.

Figure 4:
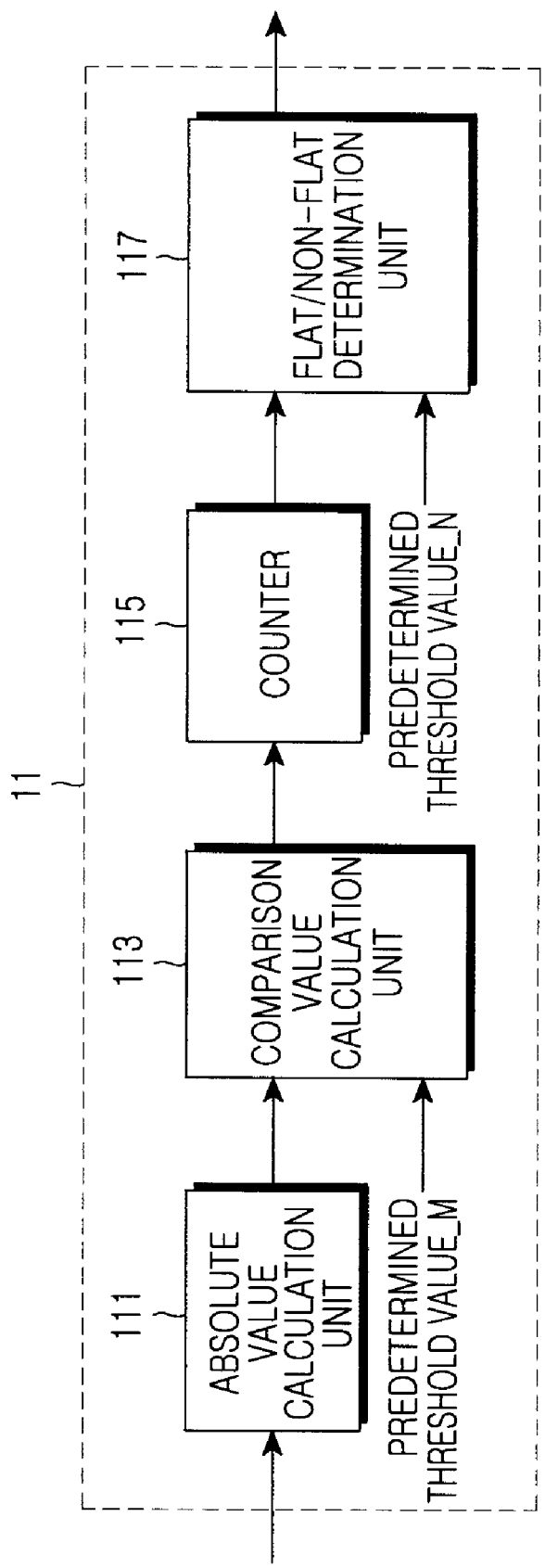
FIG. 4 is a block diagram illustrating a configuration of a flat/non-flat area check unit according to an embodiment of the present invention.

FIG. 4 is a block diagram illustrating a configuration of the flat/non-flat area check unit 11 according to an embodiment of the present invention. Referring to FIG. 4, the flat/non-flat area check unit 11 according to an embodiment of the present invention includes an absolute value calculation unit 111, a comparison value calculation unit 113, a counter 115, and a flat/non-flat determination unit 117.

The absolute value calculation unit 111 calculates an absolute value of the difference in chrominance signals between a particular pixel (e.g. a pixel E in FIG. 2) and each of surrounding pixels (e.g. pixels A, B, C, D, F, G, H, and I in FIG. 2) adjacent to the particular pixel included in the unit block. Then, the absolute value calculation unit 111 provides each calculated absolute value of the difference to the comparison value calculation unit 113.

The comparison value calculation unit 113 compares an absolute value of the difference (where the absolute value of the differences are separately input) in chrominance signals between pixels with a first threshold, value_m, and provides a value of the comparison result to the counter 115.

The counter 115 counts a number of the absolute values equal to or smaller than, or larger than the first threshold, value_m, from the values of the comparison results provided by the comparison value calculation unit 113 on a basis corresponding to the unit block, and provides a count value to the flat/non-flat determination unit 117.

If the output value of the counter 115 is larger than a second threshold, value_n, the flat/non-flat determination unit 117 determines the unit block as the flat area. On the other hand, if the output value of the counter 115 is equal to or smaller than the second threshold, value_n, the flat/non-flat determination unit 117 determines the unit block as the non-flat area.

Figures 2, 3:
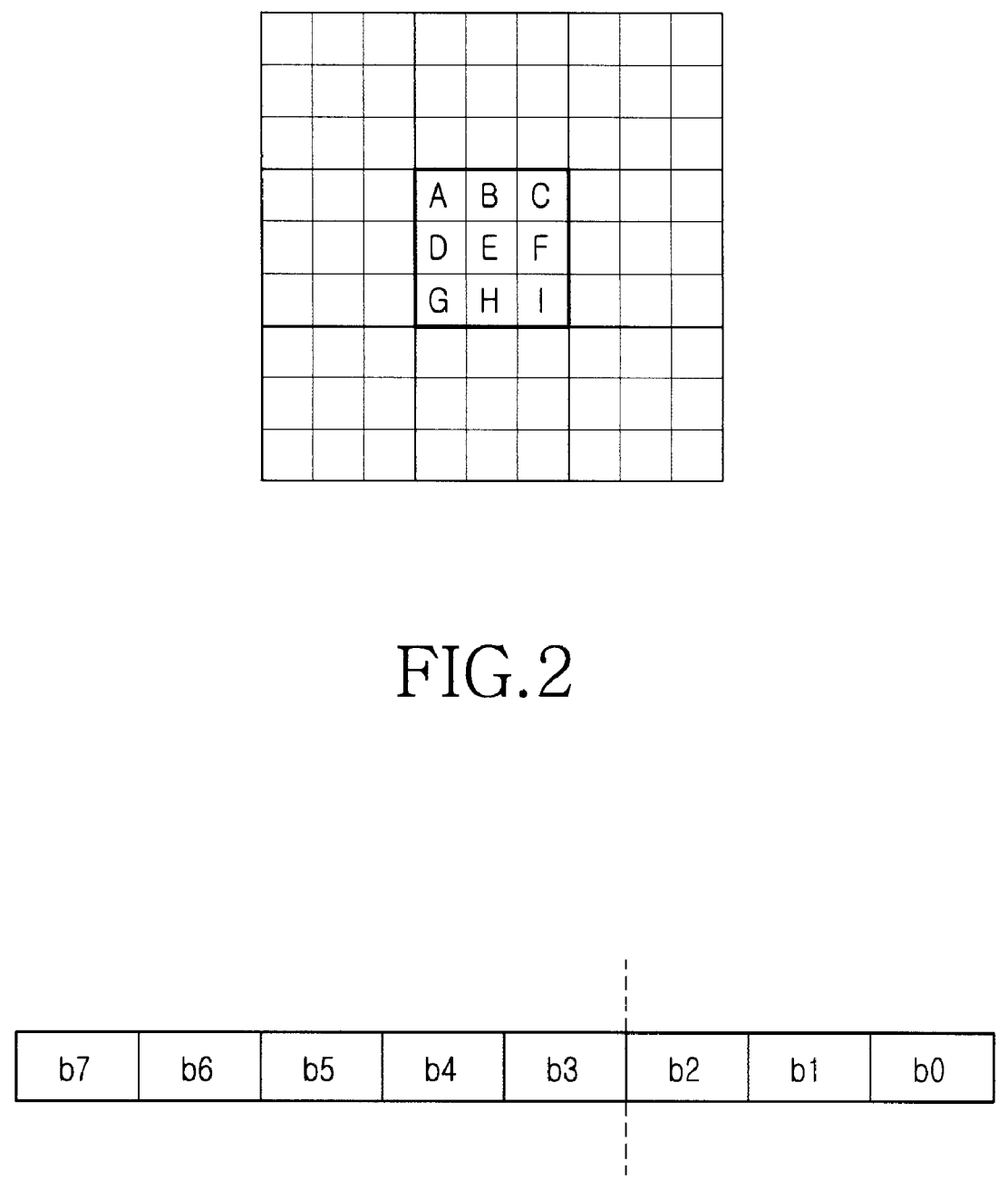

For example, as illustrated in FIG. 2, that a number of surrounding pixels adjacent to a particular pixel of the unit block is 8, the first threshold value_m, is 2, and the second threshold, value_n, is 4 which is equal to one-half of the number of the surrounding pixels. When the absolute value of the difference in the chrominance signals between the particular pixel and each surrounding pixel is equal to or smaller than 2, the comparison value calculation unit 113 outputs 1. On the other hand, when the absolute value of the difference in the chrominance signals between the particular pixel and each surrounding pixel is larger than 2, the comparison value calculation unit 113 outputs 0. Then, the counter 115 adds values of the comparison results provided by the comparison value calculation unit 113 on an eight-by-eight basis, and outputs a count value. Also, when it is assumed that the counter 115 outputs 7 as a result of adding values of the comparison results provided by the comparison value calculation unit 113, the output value of 7 of the counter 115 is larger than the second threshold, value_n, of 4. Accordingly, the flat/non-flat determination unit 117 determines the unit block as the flat area.

It is desirable that the first threshold value_m may be set to 1 or 2. Also, second threshold value_n of the particular pixel is set as one-half of a number of surrounding pixels adjacent to the particular pixel of the unit block. However, the present invention is not limited to this determination of the first and second threshold values, and therefore, it goes without saying that the first and second threshold values may be changed and formulated use a number of different methods that may be then applied to the present invention as criteria for the determination of a flat or non-flat area.

Hereinafter, an operation of the dithering apparatus according to an embodiment of the present invention will be described with reference to the configuration units as described above.

First, in the dithering apparatus according to an embodiment of the present invention, it is exemplified that an image frame input from the outside includes multiple pixels, and each of the multiple pixels includes chrominance signals of 8-bit R, 8-bit G, and 8-bit B (Red, Green, Blue) values. Also, an embodiment of the present invention exemplifies that the dithering apparatus dithers 8-bit R, 8-bit G, and 8-bit B values into 5-bit R, 6-bit G, and 5-bit B values to be output. Further, a description will be made of only a process of dithering an 8-bit R value into a 5-bit R value by the dithering apparatus according to an embodiment of the present invention. Also, the process of dithering B and G values will be omitted since a process of dithering a B value is performed in the same manner as that of dithering an R value, and a process of dithering a G value can be performed by differently setting only an adjusted number of bits.

When dithering is started, first, the flat/non-flat area check unit 11 checks if unit blocks included in image data input are a flat or non-flat area, and provides a result of the check to the dithering arithmetic unit 19 and a control unit (not shown). Specifically, whether a unit block included in the image data is the flat or non-flat area can be determined by the absolute value calculation unit 111, the comparison value calculation unit 113, the counter 115, and the flat/non-flat determination unit 117. The absolute value calculation unit 111 calculates an absolute value of the difference in chrominance signals between a particular pixel (e.g. a pixel E in FIG. 2) included in an input image frame and each of surrounding pixels (e.g. pixels A, B, C, D, F, G, H, and I in FIG. 2) adjacent to the particular pixel. Then, the absolute value calculation unit 111 provides each calculated absolute value of the difference to the comparison value calculation unit 113. The comparison value calculation unit 113 compares an absolute value of the difference (where the absolute value of the differences are separately input) in chrominance signals between pixels with a first threshold value, value_m, and provides a value of the comparison result to the counter 115. The first threshold value, value_m, is 2. Namely, when the absolute value of the difference in the chrominance signals between the particular pixel and each surrounding pixel is equal to or smaller than the first threshold value (e.g., 2), the comparison value calculation unit 113 outputs 1. On the other hand, when the absolute value of the difference in the chrominance signals between the particular pixel and each surrounding pixel is larger than the first threshold value (e.g., 2), the comparison value calculation unit 113 outputs 0. Then, the counter 115 adds values of the comparison results provided by the comparison value calculation unit 113 on a basis corresponding to a number (e.g. 8) of pixels of the unit block, and outputs a count value. Then, the flat/non-flat determination unit 117 compares an output value of the counter 115 with a second threshold value, value_n, and determines the unit block as the flat or non-flat area. For example, it is assumed that the second threshold value, value_n, is set to 4 in consideration one-half the number of pixels surrounding a particular pixel used for the determination of the flat or non-flat area, and the counter 115 provides an output as a result of adding values of the comparison results provided by the comparison value calculation unit 113. When the output value of the counter 115 is larger than the second threshold value_n (e.g., 4) the flat/non-flat determination unit 117 determines the unit block as the flat area.

When the flat/non-flat area check unit 11 goes through the operations as described above, and determines the unit block as the flat area, the control unit (not shown) controls only the bit removal unit 13 and the dithering arithmetic unit 19 to operate, so that the dithering arithmetic unit 19 can intactly provide an output value of the bit removal unit 13. On the other hand, when the flat/non-flat area check unit 11 determines the unit block as the non-flat area, the control unit controls the random number generation unit 15, the comparison unit 17, and the dithering arithmetic unit 19 to operate, so that the dithering arithmetic unit 19 can dither an output value of the bit removal unit 13 and provide a result of dithering.

Meanwhile, the bit removal unit 13 removes a number of lower bits of a chrominance signal of each pixel included in an input image frame in consideration of a bit depth of an image to be output. An embodiment of the present invention as described above exemplifies that the bit removal unit 13 outputs a 5-bit R value with respect to an 8-bit R value. Accordingly, the bit removal unit 13 removes the lower three bits of the 8-bit R value, and reconfigures the R value as a 5-bit length. A value reconfigured as the 5-bit R value is provided to the dithering arithmetic unit 19. Further, a length (number) of bits removed by the bit removal unit 13 (i.e. three bits) is provided to the random number generation unit 15, and a value represented by the removed bits is provided to the comparison unit 17.

Upon receiving as input the length of the removed bits provided by the bit removal unit 13, the random number generation unit 15 generates a random number which can be generated in a range corresponding to the length of the removed bits. Herein, numbers which can be generated by a combination of the three bits are eight integer numbers from 0 to 7, and therefore the random number generation unit 15 randomly generates any natural number ranging from 0 to 7. Further, while generating a random number in the range of the bits removed by the bit removal unit 13, the random number generation unit 15 does not re-generate an already-generated random number. For example, on the assumption that a random number is generated in the range of three bits, when initially generating a random number in the range of three bits, the random number generation unit 15 randomly generates a natural numbers ranging from 0 to 7. If a random number (e.g. 6 or 0) has already been generated in the range of three bits, the random number generation unit 15 generates a random number from the remaining numbers excluding an already-generated number (i.e. 6 or 0). After generating random numbers corresponding to all the numbers in the range, by repeating the process as described above, the random number generation unit 15 repeats the process of generating a number selected from all numbers which can be generated in the range of three bits.

A random number generated in the process as described above is input to the comparison unit 17. Then, the comparison unit 17 compares the random number generated by the random number generation unit 15 with the value represented by the removed bits provided by the bit removal unit 13. Thereafter, the comparison unit 17 provides a value of the comparison result to the dithering arithmetic unit 19. For example, the value of the comparison result may be a value indicating whether the value represented by the removed lower bits is equal to or smaller than, or larger than the generated random number.

Then, the dithering arithmetic unit 19 first receives as input a signal indicating whether the unit block corresponds to the flat or non-flat area from the flat/non-flat area check unit 11, and dithers the particular pixels of the unit block in response to the input signal. Namely, the dithering arithmetic unit 19 selectively adds "1" to an LSB of the remaining bits in consideration of a value received as input from the comparison unit 17. For example, if the value received as input from the comparison unit 17 is a value indicating whether the value represented by the removed lower bits is larger than the generated random number, the dithering arithmetic unit 19 adds "1" to the LSB of the remaining bits, and provides a value of the addition result.

Figure 5:
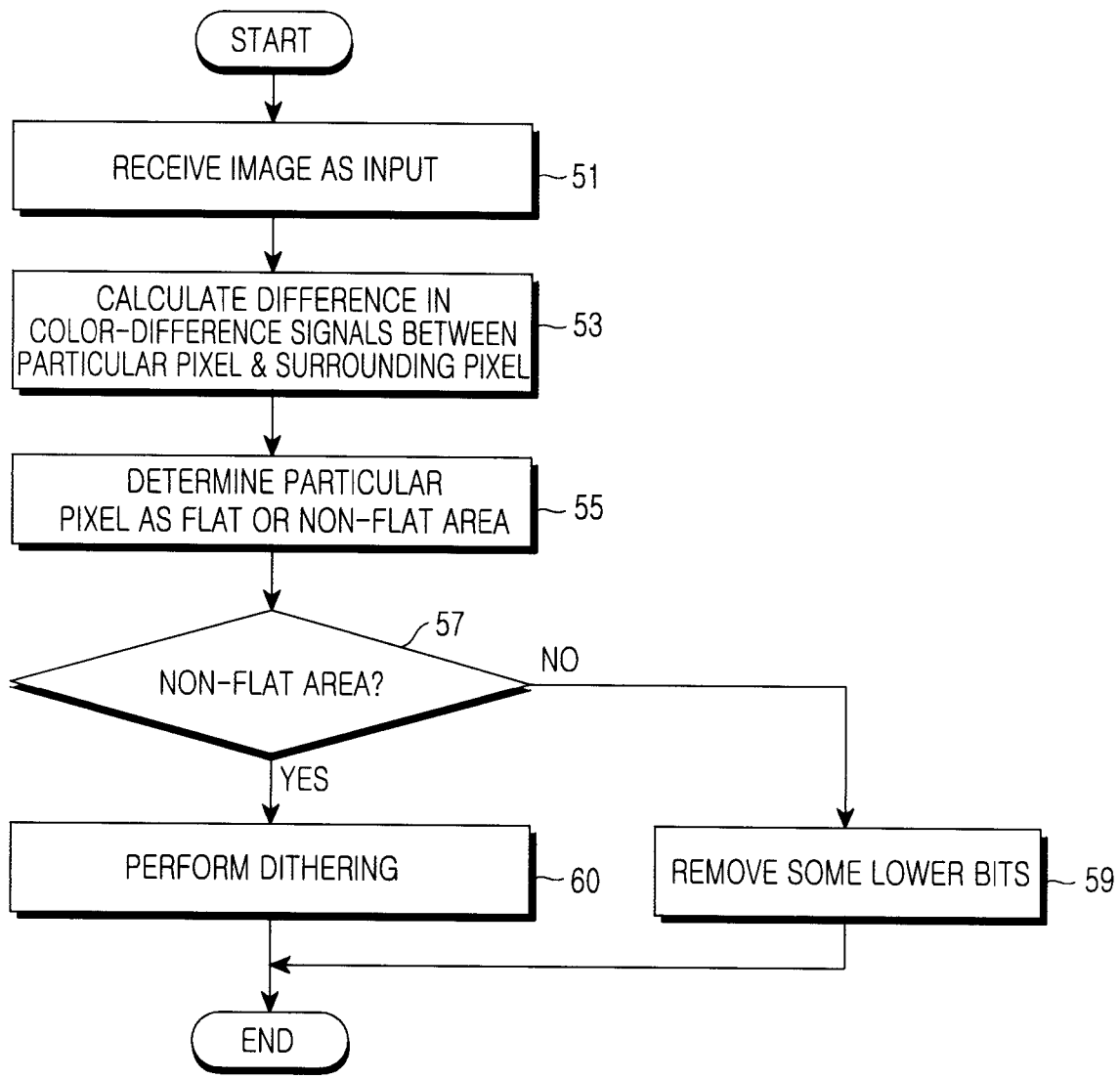
FIG. 5 is a flowchart showing a process of a dithering method according to an embodiment of the present invention.

FIG. 5 is a flowchart showing a process of a dithering method according to an embodiment of the present invention.

In the dithering method according to an embodiment of the present invention shown in FIG. 5 it is exemplified that an image frame to be dithered includes multiple unit block including multiple pixels, and each of the multiple pixels includes chrominance signals of 8-bit R, 8-bit G, and 8-bit B values. Also, an embodiment of the present invention exemplifies that the dithering method dithers 8-bit R, 8-bit Q and 8-bit B values into 5-bit R, 6-bit G, and 5-bit B values. Further, a description will be made of only a process of dithering an 8-bit R value into a 5-bit R value in the dithering method according to an embodiment of the present invention. Also, the process of dithering B and G values will be omitted since a process of dithering a B value is performed in the same manner as that of dithering an R value, and a process of dithering a G value can be performed by differently setting only an adjusted number of bits.

First, an image frame including multiple pixels is received as input from the outside in step 51. Then, in order to check if unit blocks included in image data are a flat or non-flat area, in step 53, calculation is performed for obtaining an absolute value of a difference in chrominance signals between a particular pixel (e.g. a pixel E in FIG. 2) included in unit block and each of surrounding pixels (e.g. pixels A, B, C, D, F, G, H, and I in FIG. 2) adjacent to the particular pixel.

In step 55, each calculated difference is compared with a first threshold value (e.g. 1 or 2), and determines whether the unit block is in the flat or non-flat area.

In step 55, calculation is performed for obtaining a number of pixels, each of which has a difference in chrominance signals equal to or smaller than, or larger than the second threshold value. Then, the calculated number of pixels is compared with a second threshold value predetermined for the determination of a flat or non-flat area in step 55. Herein, the second threshold value may be a number corresponding to one-half of a total number of the particular pixel of the unit block. Also, in step 55, the unit block is designated as the non-flat area if the calculated number of pixels is equal to or smaller than the second threshold value. On the other hand, if the calculated number of pixels is larger than the second threshold value, the unit block is designated as the flat area.

In step 57, the control unit checks the determination in step 55, and determines if it performs step 59 or step 60 for dithering the particular pixels included in the unit block.

In step 59, a number lower bits are removed from a chrominance signal of each pixel included in an input image frame in consideration of a bit depth of an image to be output. As described above, an embodiment of the present invention exemplifies that a 5-bit R value is output with respect to an 8-bit R value. Accordingly, in step 59, and in the example described herein, the lower three bits are removed from the 8-bit R value, and the R value is reconfigured as a 5-bit length, which is then output.

In step 60, the lower bits are removed from the chrominance signal of each pixel included in unit block of an input image frame, as in step 59, and bits to be output are reconfigured. Also, the value of "1" is added to the bits to be output by using a value represented by the removed lower bits and a generated random number.

Figure 6:
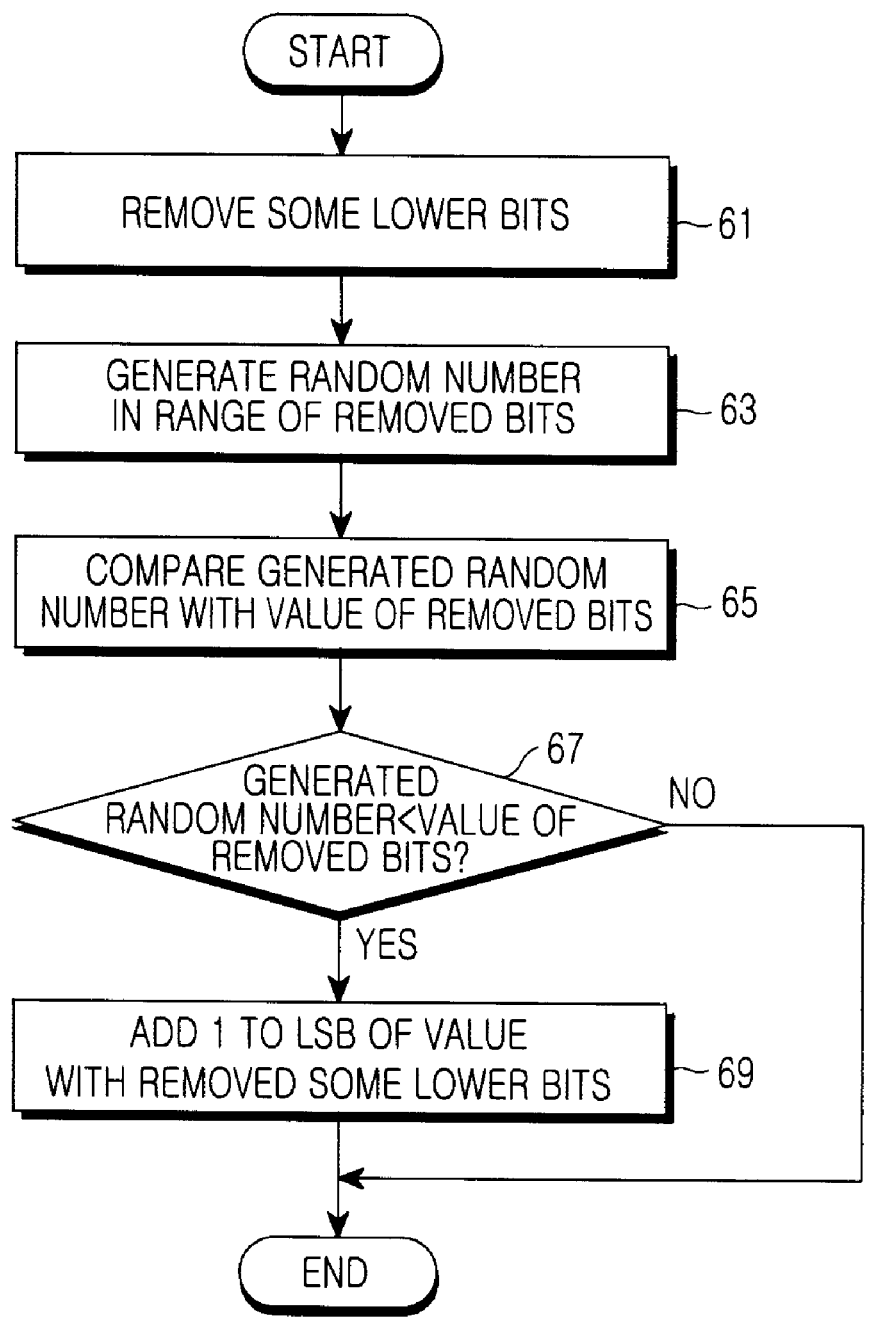
FIG. 6 is a flowchart showing a detailed process of step 60 of FIG. 5.

FIG. 6 is a flowchart showing a detailed process of step 60 of FIG. 5. In step 61, the lower bits are removed from a chrominance signal of each pixel included in the unit block of an input image frame in consideration of a bit depth of an image to be output.

In step 63, a random number is generated in a range of the value associated with the number lower bits removed in step 61. Namely, random numbers are generated, which can be generated in the range corresponding to a length of the removed bits. For example, since numbers which can be generated by a combination of the three bits are eight integer numbers from 0 to 7, a natural number ranging from 0 to 7 is randomly generated in step 63.

In step 65, a random number generated in step 63 is compared with a value represented by the lower bits removed in step 61. By using a value of the comparison result in step 65, it is checked in step 67 whether the value represented by the lower bits removed in step 61 is larger than the random number generated in step 63. If the value represented by the lower bits removed in step 61 is larger than the random number generated in step 63, the control unit proceeds to step 69 for adding the value of "1" to an LSB of reconfigured bits; in this case, 5 bits. On the other hand, if the value represented by the lower bits removed in step 61 is equal to or smaller than the random number generated in step 63, the dithering is completed.

Further, in step 63 for generating a random number, it is desirable that an already-generated random number is not re-generated while other random number can be generated in the range of the lower bits removed in step 61.

Figure 7:
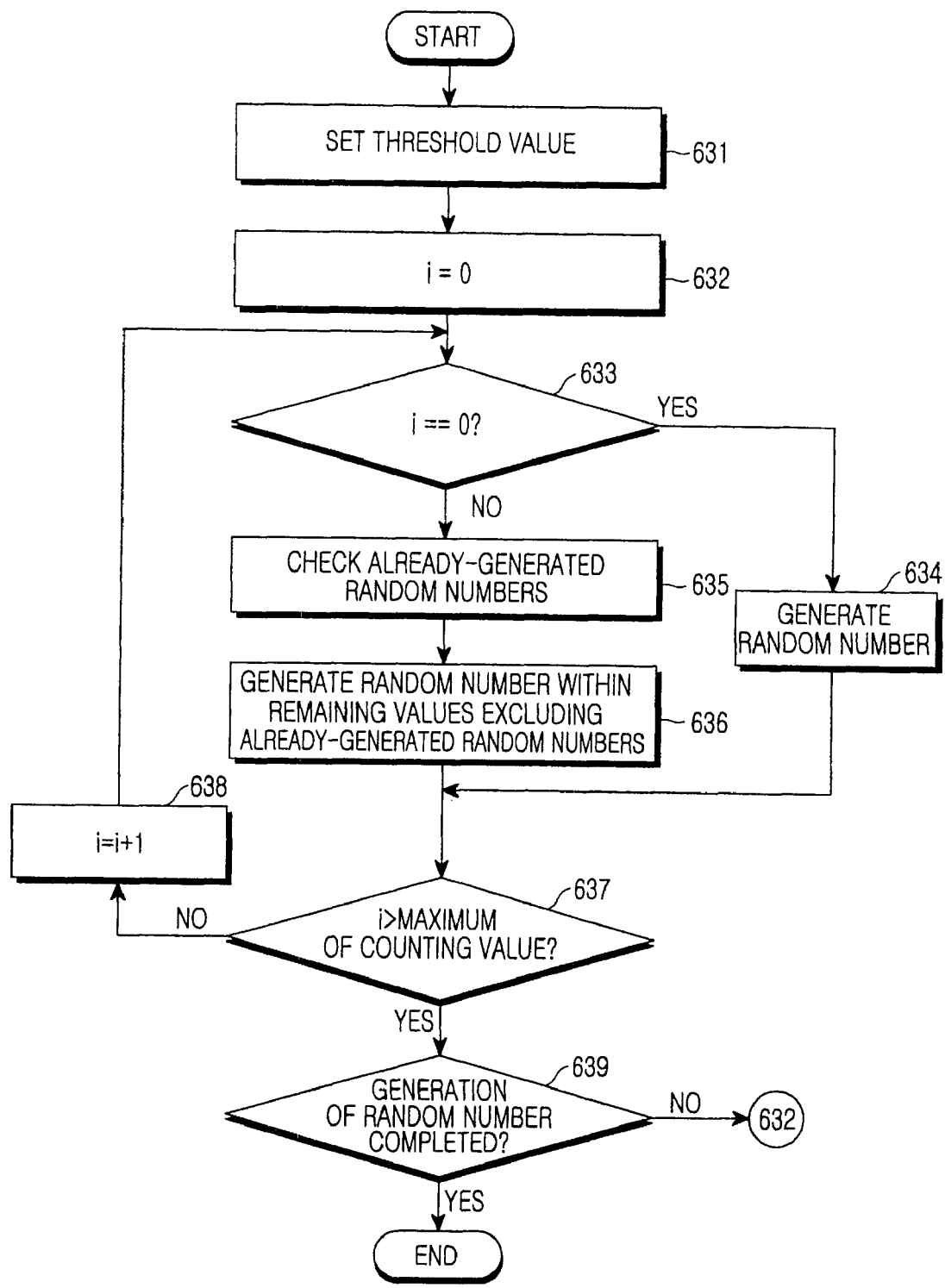
FIG. 7 is a flowchart showing a detailed process of step 63 of FIG. 6.

FIG. 7 is a flowchart showing a detailed process of step 63 of FIG. 6. Also, an embodiment of the present invention exemplifies that the lower three bits have been removed in step 61 and a random number is generated in the range of three bits in a process of step 63.

First, when a request is made for generating a random number, in step 631, the control unit checks a range of the lower bits removed in step 61, checks a number of random numbers that can be generated in the range of the removed lower bits, and then determines a maximum of counting value. For example, when the lower three bits have been removed in step 61, numbers from 0 to 7 can be generated by a combination of the three bits, therefore the maximum of counting value is set to 7 in step 631.

Next, eight random numbers are generated in the range (i.e. from 0 to 7) of the maximum of counting value. In an embodiment of the present invention, it is assumed that an order of generating a random number is "i."

In order to generate a random number in the range of the maximum of counting value, an order of generating a random number is initialized (step 632). Then, a random number is generated in the range of the maximum of counting value in a process below.

In step 633, it is determined whether a random number has already been generated in the range of the maximum of counting value. Namely, it is checked if the already-generated random number is a random number initially generated after the maximum of counting value is set. If it is determined in step 633 that the already-generated random number is a random number initially generated after the maximum of counting value is set, a natural number selected in the range (i.e. from 0 to 7) is generated as a random number in step 634.

On the other hand, if it is determined in step 633 that the already-generated random number is not a random number initially generated after the maximum of counting value is set, it is determined in step 635 which random numbers have already been generated. In step 636, a natural number is generated as a random number in consideration of the result in step 635, where the natural number is selected from the remaining natural numbers excluding the random numbers that have already been generated.

For example, it is assumed that a first-generated (i.e. i=0) random number is 6, and a second-generated (i.e. i=1) random number is 0. Then, as a third random number (i.e. i=2) generated in the range of three bits, a natural number is generated that is randomly selected from remaining natural numbers (i.e., 1, 2, 3, 4, 5, and 7) excluding the already-generated 6 and 0.

In step 637, it is determined if an i value indicating an order of generating a random number is included in the range of the maximum of counting value. If it is checked in step 637 that the i value indicating an order of generating a random number is included in the range of the maximum of counting value, a value of 1 is added to the i value in order to generate a next random number (step 638). Then, steps 633, 635, and 636 as described above are repeatedly performed.

On the other hand, if it is determined in step 637 that the i value indicating an order of generating a random number is not included in the range of the maximum of counting value, the control unit proceeds to step 639. In step 639, it is determined if all dithering of pixels included in an image frame is completed. If it is determined in step 639 that all of the dithering of pixels included in an image frame is completed, the generation of a random number is completed. On the other hand, if it is determined in step 639 that all of the dithering of pixels included in an image frame is not completed, steps 632, 633, 634, 635, 636, 637, and 638 are repeatedly performed.

According to the method and the apparatus for dithering as described above, each unit block included in an image is designated as a flat or non-flat area, and dithering using a random number is not applied to a pixel designated as a non-flat area. Hence, the method and the apparatus of the invention remove noise generated due to a random number in the process of dithering in the flat area of the image, thereby minimizing color distortion in the entire image and reducing the degradation of image quality.

Also, random numbers used in the dithering process are prevented from being concentrated, thereby minimizing color distortion in the entire image and reducing the degradation of image quality.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for dithering image data, the method comprising the steps of:
    1) checking a difference in chrominance signals between a particular pixel and a pixel adjacent to the particular pixel included in a predetermined unit block, in an input image;
    2) designating the unit block as a flat or non-flat area in consideration of the difference); and
    3) dithering pixels included in the unit block designated as the non-flat area in step 2).

2. The method as claimed in claim 1, wherein step 1) comprises a step of calculating an absolute value of the difference in chrominance signals between the particular pixel and a surrounding pixel adjacent to the particular pixel.

3. The method as claimed in claim 2, wherein step 2) comprises the sub-steps of:
   comparing, with a first threshold value, the absolute value of the difference in chrominance signals between the particular pixel and a surrounding pixel adjacent to the particular pixel;
   calculating, from a result of the comparison, a number of pixels required for determination of a flat or non-flat area in consideration of the particular pixel and a number of surrounding pixels adjacent to the particular pixel; and
   comparing the calculated number of pixels with a second threshold value for the determination of a flat or non-flat area, and
   determining the unit block as the flat or non-flat area.

4. The method as claimed in claim 3, wherein the second threshold value is a number corresponding to one-half the sum of pixels included in the unit block.

5. The method as claimed in claim 3, wherein the number of pixels required for the determination of a flat or non-flat area is a number of the absolute value of the differences smaller than the first threshold value.

6. The method as claimed in claim 5, wherein, in the step of determining the unit block as being within the flat or non-flat area, the unit block is designated as being with the flat area if the number of pixels required for the determination of the flat or non-flat area is larger than the second threshold value for the determination of the flat or non-flat area, and the unit block is designated as the non-flat area if the number of pixels required for the determination of the flat or non-flat area is equal to or smaller than the second threshold value for the determination of the flat or non-flat area.

7. The method as claimed in claim 1, wherein step 3) comprises the sub-steps of:
   removing a number of lower bits of bits representing a chrominance signal in consideration of a magnitude of an image to be reduced;
   generating a random number in a range corresponding to a value associated with the removed number of lower bits;
   comparing a value represented by the removed lower bits with the generated random number; and
   adding a value of "1" to a Least Significant Bit (LSB) of the remaining bits if it is determined that the value represented by the removed lower bits is larger than the generated random number.

8. The method as claimed in claim 7, wherein, in the step of generating a random number, the same random number as an already-generated random number is prevented from being generated in the range corresponding to the value of the removed lower bits.

9. An apparatus for dithering input image data and outputting the dithered image data, the apparatus comprising:
   a flat/non-flat area check unit for checking a difference in chrominance signals between a particular pixel and a pixel adjacent to the particular pixel included in a predetermined unit block, in an input image, and designating the unit block as a flat or non-flat area;
   a bit removal unit for removing a number of lower bits of the chrominance signal of the particular pixel of the unit block in response to a desired output bit count;
   a random number generation unit for generating a random number in a range of the value determined by said number of lower bits removed by the bit removal unit;
   a comparison unit for comparing a value of the number of lower bits removed by the bit removal unit with the random number generated by the random number generation unit, and outputting a result of the comparison; and
   a dithering arithmetic unit for receiving as an input a signal indicating whether the particular pixel corresponds to the flat or non-flat area from the flat/non-flat area check unit, and, in response to the input signal, outputting the chrominance signal with the lower bits removed by the bit removal unit, or dithering the chrominance signal with the removed lower bits based on the result of the comparison from the comparison unit.

10. The apparatus as claimed in claim 9, wherein the flat/non-flat area check unit calculates an absolute value of the difference in chrominance signals between the particular pixel and a surrounding pixel adjacent to the particular pixel included in a predetermined unit block, and checks the difference between the particular pixel and a pixel adjacent to the particular pixel.

11. The apparatus as claimed in claim 10, wherein the flat/non-flat area check unit comprises:
   an absolute value calculation unit for calculating the absolute value of the difference in chrominance signals between the particular pixel and each one of the surrounding pixels adjacent to the particular pixel included in a predetermined unit block;
   a comparison value calculation unit for comparing each absolute value of the difference in chrominance signals provided by the absolute value calculation unit with a first threshold value;
   a counter for calculating, from an output value of the comparison value calculation unit, a number of pixels required for determination of a flat or non-flat area in consideration of the particular pixel and a number of surrounding pixels adjacent to the particular pixel; and
   a flat/non-flat determination unit for comparing an output value of the counter with a second threshold value predetermined for the determination of a flat or non-flat area, and determining the unit block as the flat or non-flat area.

12. The apparatus as claimed in claim 11, wherein the second threshold value is a number corresponding to one-half of a total number of pixels of the unit block.

13. The apparatus as claimed in claim 11, wherein the counter calculates a number of the absolute value of the differences smaller than the second threshold value.

14. The apparatus as claimed in claim 13, wherein the flat/non-flat determination unit designates the unit block as being in the flat area if the output value of the counter is larger than the second threshold value, and the flat/non-flat determination unit designates the unit block as being in the non-flat area if the output value of the counter is equal to or smaller than the second threshold value.

15. The apparatus as claimed in claim 14, wherein the second threshold value for the determination of the flat or non-flat area is a number corresponding to one-half of a total number of pixels of the unit block.

16. The apparatus as claimed in claim 11, wherein the dithering arithmetic unit outputs the chrominance signal with the lower bits removed by the bit removal unit with respect to the unit block designated as the flat area; and
   wherein the dithering arithmetic unit dithers the chrominance signal with the removed lower bits with respect to the unit block designated as the non-flat area, and outputs the dithered chrominance signal.

17. The apparatus as claimed in claim 9, further comprising a random number generation unit for generating a random number in the range determined by a number of said lower bits removed by the bit removal unit, wherein a same random number as an already-generated random number is prevented from being generated.

18. A device for altering the pixel values within an image, comprising:
   a processor in communication with a memory, the memory including code which when accessed by the processor causes the processor to execute the steps of:
   receive an image including a plurality of unit block comprising a plurality of pixel elements;
   determine an absolute value of a difference in chrominance signals between a specified pixel and each of a plurality of pixel adjacent to the specified pixels included in a unit block,
   determine whether said unit block is a flat area or a non-flat area based on said absolute values of the differences, wherein said unit block is a flat area when an accumulation of the number of said absolute value of the differences over a first threshold is less than a second threshold and a non-flat area when said accumulation of the number of said absolute value of the differences over a first threshold is greater than a second threshold, wherein said second threshold is determined based on a number of pixels included in the unit block; and
   dither pixels of the unit block designated as the non-flat area, the dither step comprising sub steps of:
      remove a number of lower bits of bits representing a chrominance signal in consideration of a magnitude of an image to be reduced;
      generate a random number in a range corresponding to a value associated with the removed number of lower bits;
      compare a value represented by the removed lower bits with the generated random number; and
      add a value of "1" to a Least Significant Bit (LSB) of the remaining bits if it is determined that the value represented by the removed lower bits is larger than the generated random number.

19. The device as claimed in claim 18, wherein, in the step of generate a random number comprises:
   generate said random number within a range of random numbers determined by a value determined by said number of removed bits;
   determine whether said generated random number is the same as a previously generated random number;
   prevent the use of said generated random number when said generated random number is determined to be the same as a previously generated random number, until all random numbers within the range of random numbers determined by a value determined by said number of removed bits have been generated; and
   indicate said generated random number has been used.

* * * * *